United States Patent
Zhou et al.

(10) Patent No.: US 10,723,931 B2
(45) Date of Patent: Jul. 28, 2020

(54) THINNER FOR OIL-BASED DRILLING FLUIDS

(71) Applicant: CNPC USA CORPORATION, Houston, TX (US)

(72) Inventors: Chun Zhou, Sugar Land, TX (US); Fuchen Liu, Panjin (CN); Burhan Hoxha, Houston, TX (US)

(73) Assignee: CNPC USA CORPORATION, Houston, TX (US)

( * ) Notice: Subject to any disclaimer, the term of this patent is extended or adjusted under 35 U.S.C. 154(b) by 192 days.

(21) Appl. No.: 14/945,697

(22) Filed: Nov. 19, 2015

(65) Prior Publication Data

US 2017/0145286 A1 May 25, 2017

(51) Int. Cl.
- *C09K 8/035* (2006.01)
- *C09K 8/32* (2006.01)
- *E21B 21/06* (2006.01)

(52) U.S. Cl.
CPC .............. *C09K 8/32* (2013.01); *E21B 21/062* (2013.01)

(58) Field of Classification Search
CPC . C09K 8/36; C09K 8/32; C09K 8/035; C09K 8/34; C09K 8/512; C09K 8/12; C09K 8/502; C09K 8/24; C09K 8/5045; C09K 8/508; C09K 8/514; C09K 8/04; C09K 8/08; C09K 8/28; C09K 8/506; C09K 8/5083; C09K 8/5086; C09K 8/52; C09K 2208/12; C09K 2208/34; C09K 3/00; C09K 8/516; C09K 8/70; C09K 2208/28; C09K 2208/32; C09K 8/03; C09K 8/06; C09K 8/42; C09K 8/44; C09K 8/467; C09K 8/528; E21B 49/05; E21B 23/06; E21B 33/138; E21B 43/103; E21B 21/062; E21B 7/00; E21B 21/068; E21B 19/22; E21B 2021/006; E21B 21/003; E21B 21/01; E21B 21/065; E21B 21/08; E21B 33/12; E21B 33/1208
See application file for complete search history.

(56) References Cited

U.S. PATENT DOCUMENTS

| | | | |
|---|---|---|---|
| 3,047,494 A | 7/1962 | Browning | |
| 3,085,976 A | 4/1963 | Phansalkar et al. | |
| 3,639,233 A * | 2/1972 | Schultz | C09K 8/32 507/126 |
| 4,148,736 A | 4/1979 | Meister | |
| 4,502,963 A * | 3/1985 | Harmon | C09K 8/36 507/107 |
| 5,098,609 A | 4/1992 | Iruvanti et al. | |
| 7,638,466 B2 | 12/2009 | Mueller et al. | |
| 7,825,071 B2 | 11/2010 | Ballard | |
| 7,951,755 B2 | 5/2011 | Wu et al. | |
| 8,148,305 B2 | 4/2012 | Westfechtel et al. | |
| 8,708,047 B2 | 4/2014 | Chakraborty et al. | |
| 2003/0144153 A1 * | 7/2003 | Kirsner | C09K 8/32 507/100 |
| 2004/0116304 A1 | 6/2004 | Wu et al. | |
| 2011/0136701 A1 | 6/2011 | Prebensen et al. | |
| 2013/0079536 A1 | 3/2013 | Chen et al. | |
| 2013/0331302 A1 | 12/2013 | Patel et al. | |
| 2014/0057810 A1 | 2/2014 | Fisk, Jr. | |

FOREIGN PATENT DOCUMENTS

EP 2589639 A1 5/2013

OTHER PUBLICATIONS

Sigma Aldrich Sheet downloaded on Aug. 2, 2017.*
https://en.wikipedia.org/wiki/Stearic_acid downloaded on Aug. 2, 2017.*
I. Kutasov, Downhole temperature, pressure methods are accurate for drilling, completion, cement Design, Oil & Gas Journal, Sep. 16, 2002 (https://www.ogj.com/articles/print/volume-100/issue-38/drilling-production/downhole-te . . . downloaded on Nov. 28, 2018.*
Aluminum Rolling Mill Processes, Croda Europe Ltd., 2009.
Safety Data Sheet, Croda, Hypermer LP1-LQ-(MV), Apr. 24, 2015.

* cited by examiner

*Primary Examiner* — Kumar R Bhushan
(74) *Attorney, Agent, or Firm* — Ramey; William P. Ramey; Melissa D. Schwaller

(57) ABSTRACT

A thinner that is a polycondensed fatty acid that is selected from the group consisting of 12-hydroxystearic acid, 12-hydroxyoctadecanoic acid, polyhydroxystearic acid, reaction products with stearic acid, octadecanoate, octadecanoic acid, and homopolymers of stearic acid is able to reduce the viscosity of oil-based drilling fluid, thus allowing for reuse of the oil-based drilling fluid.

8 Claims, 2 Drawing Sheets

THINNER FOR OIL-BASED DRILLING FLUIDS

FIELD

The disclosure relates generally to oil production. The disclosure relates specifically to oil-based drilling fluids.

BACKGROUND

The viscosity of oil-based drilling fluid (mud) is higher after it returns to the surface than when it was injected in the wellbore due to a high solid content. Drill cuttings are transported to the surface in the drilling fluid. If a drilling fluid is too viscous, it will be difficult to pump. During drilling, after reaching the surface, the cuttings can be separated from the drilling fluid and the drilling fluid can be recirculated and reused. A settling pit can be used to separate the cuttings from the drilling fluid. If the solid particles are too fine (e.g., less than 0.1 nm), they may remain in suspension in the drilling fluid. The presence of the solid particles cause increased drilling fluid viscosity and gel strengths.

It would be advantageous to have a thinner that can be added to oil-based drilling fluid to reduce the viscosity of the oil-based drilling fluid after it returns to the surface so that the fluid can be reused.

SUMMARY

An embodiment of the disclosure is a method of decreasing viscosity of an oil-based drilling fluid composition comprising a) adding a thinner to the oil-based drilling fluid to form an oil-based drilling fluid composition; wherein the thinner is 0.03-0.2% of a polycondensed fatty acid that is selected from the group consisting of 12-hydroxystearic acid, 12-hydroxyoctadecanoic acid, polyhydroxystearic acid, reaction products with stearic acid, octadecanoate, octadecanoic acid, and homopolymers of stearic acid; b) injecting the oil-based drilling fluid composition into a wellbore; and c) retrieving the oil-based drilling fluid composition as it returns to the surface. In an embodiment, steps a)-c) are repeated. In an embodiment, the temperature of the wellbore is 180 degrees C. or less. In an embodiment, the temperature of the wellbore is 130 degrees C. or less. In an embodiment, the temperature of the wellbore is 22 degrees C. or above. In an embodiment, viscosity of the oil-based drilling fluid composition after addition of the thinner is decreased by up to 75% of the yield point in comparison to viscosity of the oil-based drilling fluid before addition of the thinner. In an embodiment, viscosity of the oil-based drilling fluid composition after addition of the thinner is decreased by up to 50% of the yield point in comparison to viscosity of the oil-based drilling fluid before addition of the thinner. In an embodiment, the oil-based drilling fluid comprises 50-100% oil; 1-5% viscosifier; 20-70% weighting agent; 5-10% fluid loss additives; 0-5% lime; 0-30% brine; and 0.3-10% emulsifiers.

An embodiment of the disclosure is an oil-based drilling fluid composition comprising 0.03-0.2% of a polycondensed fatty acid that is selected from the group consisting of 12-hydroxystearic acid, 12-hydroxyoctadecanoic acid, polyhydroxystearic acid, reaction products with stearic acid, octadecanoate, octadecanoic acid, and homopolymers of stearic acid; wherein the oil-based drilling fluid composition comprises a concentration of a polycondensed fatty acid that is selected from the group consisting of 12-hydroxystearic acid, 12-hydroxyoctadecanoic acid, polyhydroxystearic acid, reaction products with stearic acid, octadecanoate, octadecanoic acid, and homopolymers of stearic acid effective to act as a thinner; and wherein the oil-based drilling fluid composition is reusable. In an embodiment, the temperature of the wellbore is between 130-180 degrees C. In an embodiment, the temperature of the wellbore is 130 degrees C. or less. In an embodiment, viscosity of the oil-based drilling fluid composition after addition of the thinner is decreased by up to 75% of the yield point in comparison to viscosity of the oil-based drilling fluid before addition of the thinner. In an embodiment, viscosity of the oil-based drilling fluid composition after addition of the thinner is decreased by up to 50% of the yield point in comparison to viscosity of the oil-based drilling fluid before addition of the thinner. In an embodiment, the oil-based drilling fluid comprises 50-100% oil; 1-5% viscosifier; 20-70% weighting agent; 5-10% fluid loss additives; 0-5% lime; 0-30% brine; and 0.3-10% emulsifiers.

An embodiment of the disclosure is a wellbore comprising an oil-based drilling fluid composition comprising 0.03-0.2% of a polycondensed fatty acid that is selected from the group consisting of 12-hydroxystearic acid, 12-hydroxyoctadecanoic acid, polyhydroxystearic acid, reaction products with stearic acid, octadecanoate, octadecanoic acid, and homopolymers of stearic acid; wherein the oil-based drilling fluid composition comprises an effective concentration of a thinner; and wherein the oil-based drilling fluid composition is reusable. In an embodiment, the temperature of the wellbore is 180 degrees C. or less. In an embodiment, the temperature of the wellbore is 130 degrees C. or less. In an embodiment, viscosity of the oil-based drilling fluid composition after addition of the thinner is decreased by up to 75% of the yield point in comparison to viscosity of the oil-based drilling fluid before addition of the thinner. In an embodiment, viscosity of the oil-based drilling fluid composition after addition of the thinner is decreased by up to 50% of the yield point in comparison to viscosity of the oil-based drilling fluid before addition of the thinner. In an embodiment, the oil-based drilling fluid comprises 50-100% oil; 1-5% viscosifier; 20-70% weighting agent; 5-10% fluid loss additives; 0-5% lime; 0-30% brine; and 0.3-10% emulsifiers.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

Figure 1:
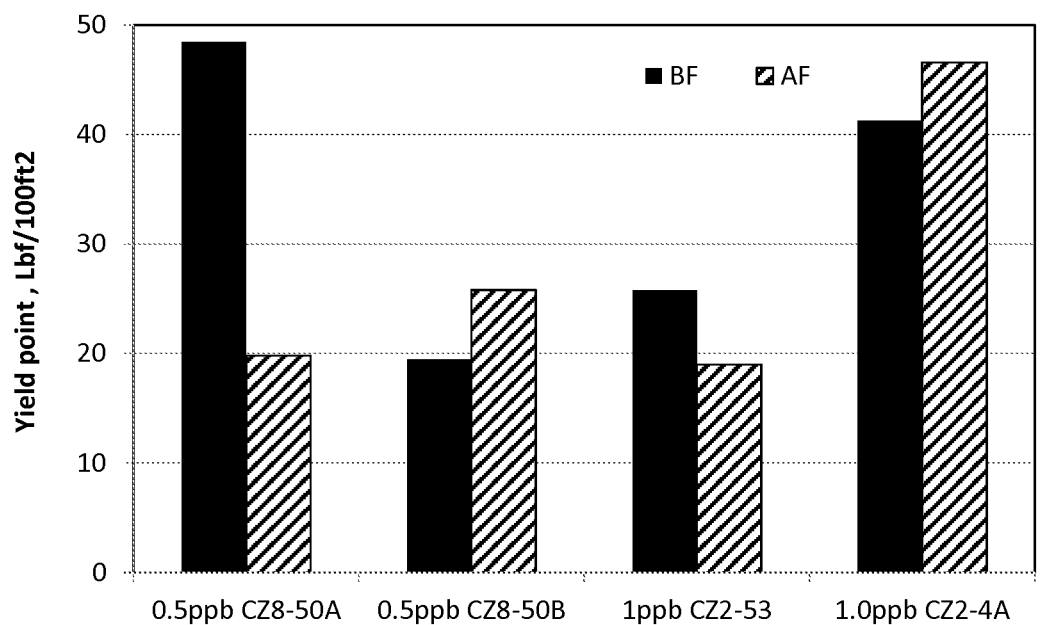
FIG. 1 plots the yield point comparison of before (BF) and after (AF) addition of various thinner candidates.

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary $3^{rd}$ Edition.

As used herein, the term "viscosity" means and refers to the property of a fluid that resists the force tending to cause the fluid to flow. Viscosity is a quantity expressing the magnitude of internal friction, as measured by the force per unit area resisting a flow in which parallel layers unit distance apart have unit speed relative to one another.

As used herein, the term "thinner" means and refers to a deflocculant, an agent used to reduce viscosity or prevent flocculation. Flocculation is the process in which fine particles aggregate together.

As used herein, the term "dispersant" means and refers to a chemical that aids in breaking up solids or liquids as fine particles or droplets into another medium.

Oil-based mud viscosity rises too high after returning to surface. A thinner can be used to decrease the viscosity of the oil-based mud. Different thinners may function better at low temperatures or high temperatures. In an embodiment, various thinners provide a decrease in viscosity at low temperatures. In an embodiment, low temperature thinners are used at a temperature range of about 22-180° C. In an embodiment, low temperature thinners are used at a temperature range of about 130-180° C. In an embodiment, various thinners provide a decrease in viscosity at a high temperatures. In an embodiment, high temperature thinners are used at a temperature of about 22-250° C. In an embodiment, high temperature thinners are used at a temperature of about 220-250° C.

In an embodiment, a thinner made from poly fatty amides from fatty acid or oil reacted with polyamines at 100-200° C., reacted with maleic acid from 80-150° C., and diluted with over 40% oleyl alcohol, fatty acid, or poly condensed fatty acid can be used to decrease oil-based mud viscosity at temperatures up to about 220-250° C. In an embodiment, the thinner is named CZ11-35A. In an embodiment, the high temperature thinner allows the drilling fluid to be reused. In an embodiment, the mud weight (MW) is 2.4. In an embodiment, the MW is 2.8.

In an embodiment, CZ8-50A effectively reduces the viscosity of oil-based drilling fluid that has high solid content. CZ8-50A is a polycondensed fatty acid that is selected from the group consisting of 12-hydroxystearic acid, 12-hydroxyoctadecanoic acid, polyhydroxystearic acid, reaction products with stearic acid, octadecanoate, octadecanoic acid, and homopolymers of stearic acid. In an embodiment, CZ8-50A provides a decrease in viscosity of the oil-based mud at low temperatures. In an embodiment, the low temperature thinner allows the drilling fluid to be reused.

CZ8-50A is also known as Hypermer LP1, obtained from Croda Inc, 300-A Columbus Circle, Edison, N.J. 08837. Croda promotes it as a polymeric dispersant and wetting agent. Hypermer LP-1 is a polymeric surfactant of high molecular weight exhibiting excellent solubility in both naphthenic and paraffinic mineral oils. It also imparts emulsion stabilizing characteristics. It is a waxy solid at 25° C. It is a non-ionic surfactant—ester that can function as an emulsifier and is water-miscible. CZ8-50A is a polycondensed fatty acid. It has a CAS No. of 58128-22-6.

CZ8-50A is a thinner that can reduce oil-based mud viscosity to allow the fluid to be reused if needed. The product can be added to a drilling mud to thin it or lower its viscosity in a concentration range of 0.03-0.2 wt % (0.25-1.5 ppb). In an embodiment, the concentration range is 0.03-2%. In an embodiment, the MW is 2.2. In another embodiment, the MW is 2.4. In an embodiment, the thinner may be used at a concentration of up to 2%. It may require dilution in field applications for ease of metering. The thinner is highly effective and has good biodegradability. It is much more effective than other thinner candidates evaluated.

In an embodiment, the thinner can be a compound of the formula (I):

where:
$R^1$ is the residue of a group having at least m active hydrogen atoms where m is at least 2; AO is an alkylene oxide residue; each n is independently from 0 to 100; and each $R^2$ is independently H or an acyl group $COR^3$ where each $R^3$ is independently a residue of a polyhydroxyalkyl or polyhydroxyalkenyl carboxylic acid, a residue of a hydroxyalkyl or hydroxyalkenyl carboxylic acid and/or a residue of an oligomer of the hydroxyalkyl or hydroxyalkenyl carboxylic acid wherein on average at least 2 of $R_2$ is an acyl group. US2013/0079536.

In an embodiment, the oil-based drilling fluid comprises 50-100% oil; 1-5% viscosifier; 20-70% weighting agent; 5-10% fluid loss additives; 0-5% lime; 0-30% brine; and 0.3-10% emulsifiers. In an embodiment, the emulsifier is 0.3-5%. In an embodiment, the brine is present at 5-25%. In an embodiment, the brine is a chloride, bromide, potassium, iodine, formate, sodium, calcium, zinc salt or combination thereof. In an embodiment, the brine is $CaBr_2$, $CaCO_3$, $CaCl_2$, NaCl, $ZnBr_2$, KCl, or combinations thereof.

Viscosity can be measured by methods including, but not limited to, a funnel or a rotating viscometer. The rotating viscometer provides plastic viscosity (PV) and yield point (YP). The rotating viscometer turns a rotor sleeve at various revolutions per minute in a container of mud. The torque on the mud is measured by a concentric bob. The measurements at various revolutions per minute allows determination of the plastic viscosity (PV) and yield point (YP). According to Bingham plastic model, PV=Θ600-Θ300; YP=PV-Θ300; Θ600 and Θ300 are the shear stress readings at 600 rpm and 300 rpm.

EXAMPLES

Example 1

Several thinner candidates were evaluated in four different mud systems that differed only in thinner. The emulsifier and other components of the systems were the same. The mud viscosities were then measured on before (BF) and after (AF) addition of thinner candidate. The measurements were performed at 6 shear rates of 600, 300, 200, 100, 6, and 3 rpm. The test temperature was 150° F. The plastic viscosity (PV) and yield point (YP) were calculated.

It can be seen from Table 1 that CZ8-50A exhibits superb performance, significantly lowering the viscosities of mud 1 at all shear rates. CZ8-50B and CZ2-4A did not reduce the mud viscosities and instead increased viscosities. CZ2-53 showed some viscosity reduction but not to the same magnitude as CZ8-50A. CZ8-50A is a polycondensed fatty acid that is selected from the group consisting of 12-hydroxystearic acid, 12-hydroxyoctadecanoic acid, polyhydroxystearic acid, reaction products with stearic acid, octadecanoate, octadecanoic acid, and homopolymers of stearic acid; CZ8-50B is Stepan, Bio-soft®N25-7 which is a linear alcohol (C12-15) ethoxylate POE-7, liquid; CZ2-53 is a CNPC USA, fatty imidazline; CZ2-53 is (Z)-4-((2-(2-((E)-heptadec-8-en-1-yl)-4,5-dihydro-1H-imidazol-1-yl)ethyl) amino)-4-oxobut-2-enoic acid (70%) with 30% butanol; and CZ2-4A is Akzo Nobel, Berol® 840 which is poly(oxy-1, 2-ethanediyl), a-(2-ethylhexy)-w-hydroxy-. HT EA 20 is a mixture of a fatty cross-linked polyamide with oleyl alcohol and oleic acid. It is 20% oleic acid; 20% oleyl alcohol; 20% of 1,3-dihydroxypropan-2-yl (E)-12-hydroxyoctadec-9-enoate; 8% of each (9E, 9'E)-N,N'-(azanediylbis(ethane-2,1-diyl))bis(12-hydroxyoctadec-9-enamide); (E)-12-hydroxy-N,N-bis(2-((E)-12-hydroxyoctadec-9-enamido)ethyl) octadec-9-enamide; (Z)-4-bis(2-((E)-12-hydroxyoctodec-9-enamido)ethyl) amino)-4-oxobut-2-enoic acid; 1,3-dihyroxypropan-2-yl(Z)-4-(bis(2-((E)-12-hydroxyoctadec-9-enamido)ethyl)amino)-4-oxobut-2-enoate; and $N^1$, $N^1$, $N^4$, $N^4$-tetrakis(2-((E)-12-hydroxyoctadec-9-enamido) ethyl)maleamide.

TABLE 1

Comparison of CZ8-50A with other thinner candidates.

| | Mud | | | | | | | | | | | |
|---|---|---|---|---|---|---|---|---|---|---|---|---|
| | 1 | | | 2 | | | 3 | | | 4 | | |
| | | | | | | Emulsifier | | | | | | |
| | HT EA 20 | | | HT EA 20 | | | HT EA 20 | | | HT EA 20 | | |
| | | | | | | Thinner | | | | | | |
| | 0.5 ppb CZ8-50A | | | 0.5 ppb CZ8-50B | | | 1.0 ppb CZ2-53 | | | 1.0 ppb CZ2-4A | | |
| Rheology | BF | AF | % change | BF | AF | % change | BF | AF | % change | BF | AF | % change |
| 600 rpm | 169.1 | 122.1 | −27.79 | 122.8 | 162.9 | 32.65 | 162.9 | 144 | −11.60 | 159.2 | 190.3 | 19.54 |
| 300 rpm | 109.5 | 70.4 | −35.71 | 71.1 | 94.2 | 32.49 | 94.2 | 82.3 | −12.63 | 100.9 | 118.8 | 17.74 |
| 200 rpm | 86.6 | 52.1 | −39.84 | 53.3 | 69 | 29.46 | 69 | 59.9 | −13.19 | 78.4 | 82.3 | 4.97 |
| 100 rpm | 61 | 31.6 | −48.20 | 33.6 | 42.1 | 25.30 | 42.1 | 36.1 | −14.25 | 53.8 | 62.6 | 16.36 |
| 6 rpm | 25.5 | 6 | −76.47 | 9.3 | 10.2 | 9.68 | 10.2 | 7.6 | −25.49 | 20.2 | 22.9 | 13.37 |
| 3 rpm | 23.1 | 4.1 | −82.25 | 7.8 | 8 | 2.56 | 8 | 5.9 | −26.25 | 18.3 | 20.8 | 13.66 |
| PV | 60 | 50 | −16.67 | 51.2 | 68.4 | 33.59 | 68.4 | 63.6 | −7.02 | 59.3 | 72.7 | 22.60 |
| YP | 48.5 | 19.8 | −59.18 | 19.5 | 25.8 | 32.31 | 25.8 | 19 | −26.36 | 41.3 | 46.6 | 12.83 |
| 10" | 24.6 | 5.5 | −77.64 | 9.6 | 10.3 | 7.29 | 10.3 | 7.9 | −23.30 | 21.1 | 23.5 | 11.37 |
| 10' | 29.6 | 9.6 | −67.57 | 13.8 | 15.9 | 15.22 | 15.9 | 11.2 | −29.56 | 30.7 | 33.5 | 9.12 | ppb = pounds per barrel

FIG. 1 plots the yield point comparison of before (BF) and after (AF) addition of thinner candidates. According to FIG. 1, CZ8-50A reduced the yield point the greatest of the candidates tested.

Example 2

CZ8-50A performed well in different concentrations to effectively reduce mud viscosities.

TABLE 2

Performance of CZ8-50A in different concentrations (g/350 mL mud).

| | Mud | | | | | | | | | | | |
|---|---|---|---|---|---|---|---|---|---|---|---|---|
| | 5 | | | 2 | | | 6 | | | 7 | | |
| | | | | | | Emulsifier | | | | | | |
| | HT EA 20 | | | HT EA 20 | | | HT EA 20 | | | HT EA 20 | | |
| | | | | | | Thinner | | | | | | |
| | 0.2071 g CZ8-50A | | | 0.512 g CZ8-50A | | | 1.0338 g CZ8-50A | | | 1.5020 g CZ8-50A | | |
| Rheology | BF | AF | % change | BF | AF | % change | BF | AF | % change | BF | AF | % change |
| 600 | 145.3 | 124.1 | −14.59 | 169.1 | 122.1 | −27.79 | 150.2 | 123.5 | −17.78 | 192.3 | 121.4 | −36.87 |
| 300 | 93 | 73.5 | −20.97 | 109.5 | 70.4 | −35.71 | 94.7 | 66.8 | −29.46 | 123.8 | 71.3 | −42.41 |
| 200 | 73.1 | 55.2 | −24.49 | 86.6 | 52.1 | −39.84 | 75.8 | 47.8 | −36.94 | 100.3 | 53.3 | −46.86 |
| 100 | 50.8 | 35.1 | −30.91 | 61 | 31.6 | −48.20 | 53.6 | 27.9 | −47.95 | 72.3 | 33.9 | −53.11 |

TABLE 2-continued

Performance of CZ8-50A in different concentrations (g/350 mL mud).

| | Mud | | | | | | | | | | | |
|---|---|---|---|---|---|---|---|---|---|---|---|---|
| | 5 | | | 2 | | | 6 | | | 7 | | |
| | Emulsifier | | | | | | | | | | | |
| | HT EA 20 | | | HT EA 20 | | | HT EA 20 | | | HT EA 20 | | |
| | Thinner | | | | | | | | | | | |
| | 0.2071 g CZ8-50A | | | 0.512 g CZ8-50A | | | 1.0338 g CZ8-50A | | | 1.5020 g CZ8-50A | | |
| Rheology | BF | AF | % change | BF | AF | % change | BF | AF | % change | BF | AF | % change |
| 6 | 19.9 | 10.1 | −49.25 | 25.5 | 6 | −76.47 | 24.3 | 6.1 | −74.90 | 31.9 | 9.6 | −69.91 |
| 3 | 18 | 8.9 | −50.56 | 23.1 | 4.1 | −82.25 | 22.1 | 5.2 | −76.47 | 29.3 | 8.1 | −72.35 |
| PV | 52.8 | 51.9 | −1.70 | 60 | 50 | −16.67 | 56.3 | 55 | −2.31 | 68.5 | 49.9 | −27.15 |
| YP | 39.7 | 21.6 | −45.59 | 48.5 | 19.8 | −59.18 | 40.3 | 10 | −75.19 | 55.4 | 20.8 | −62.45 |
| 10" | 19.1 | 13.1 | −31.41 | 24.6 | 5.5 | −77.64 | 23.9 | 7.5 | −68.62 | 30.5 | 8.5 | −72.13 |
| 10' | 23.5 | 22.2 | −5.53 | 29.6 | 9.6 | −67.57 | 28 | 15.1 | −46.07 | 36.6 | 12 | −67.21 |

Figure 2:
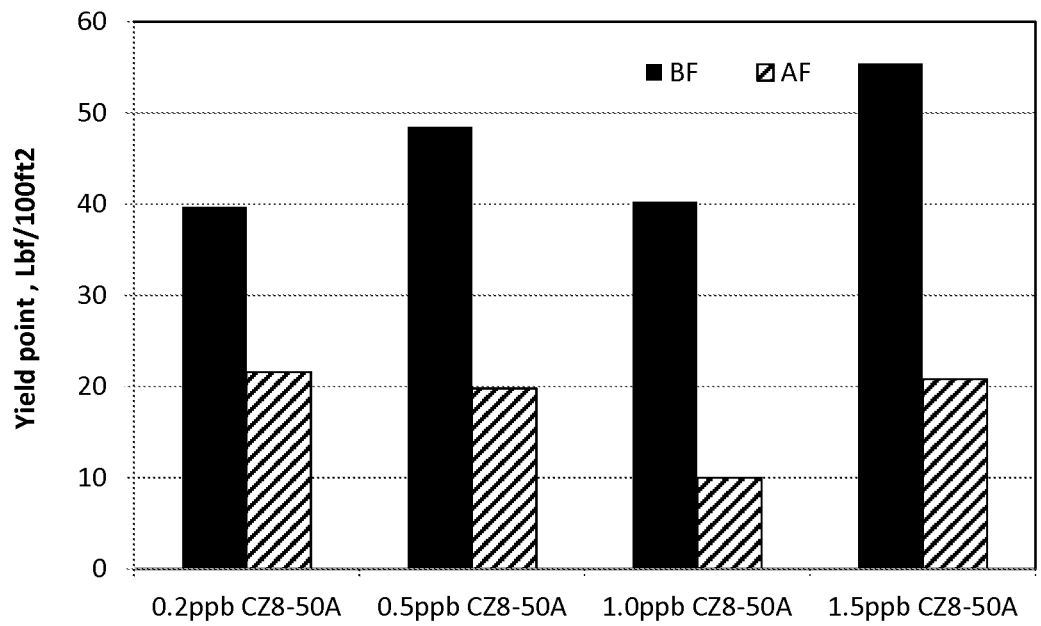
FIG. 2 plots the yield point comparison of before (BF) and after (AF) addition of different concentrations of CZ8-50A.

FIG. 2 plots the yield point comparison of before (BF) and after (AF) addition of different concentrations of CZ8-50A. According to FIG. 2, the greatest reduction in yield point after addition of CZ8-50A was at 1.5 ppb.

According to Table 2, all concentrations of CZ8-50A tested effectively reduced the viscosity of the mud. In Table 2, the best concentration of CZ8-50A for reducing mud viscosity of those tested is 1.0338 g/350 ml mud.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the disclosure as defined by the appended claims.

What is claimed is:

1. A method of decreasing viscosity of an oil-based drilling fluid composition comprising
    a) Adding a thinner to the oil-based drilling fluid to form an oil-based drilling fluid composition; wherein the thinner is 0.03-0.2% of a polycondensed fatty acid that is selected from the group consisting of 12-hydroxystearic acid, polyhydroxystearic acid, stearic acid, reaction products with stearic acid, salts containing octadecanoate anion, homopolymers of stearic acid, fatty imidazoline (Z)-4-((2-(2-((E)-heptadec-8-en-1-yl)-4,5-dihydro-1H-imidazol-1-yl)ethyl)amino)-4-oxobut-2-enoic acid and mixtures thereof; wherein the molecular weight of the thinner is 600-2.4 kilodaltons;
    b) injecting the oil-based drilling fluid composition into a wellbore; and
    c) retrieving the oil-based drilling fluid composition as it returns to the surface.

2. The method of claim 1 wherein steps a)-c) are repeated.

3. The method of claim 1 wherein the temperature of the wellbore is 180 degrees C. or less.

4. The method of claim 1 wherein the temperature of the wellbore is 130 degrees C. or less.

5. The method of claim 1 wherein the temperature of the wellbore is 22 degrees C. or above.

6. The method of claim 1 wherein viscosity of the oil-based drilling fluid composition after addition of the thinner is decreased by up to 75% of the yield point in comparison to viscosity of the oil-based drilling fluid before addition of the thinner.

7. The method of claim 1 wherein viscosity of the oil-based drilling fluid composition after addition of the thinner is decreased by up to 50% of the yield point in comparison to viscosity of the oil-based drilling fluid before addition of the thinner.

8. The method of claim 1 wherein the oil-based drilling fluid comprises
    50-100% oil base;
    1-5% viscosifier;
    20-70% weighting agent;
    5-10% fluid loss additives;
    0-5% lime;
    0-30% brine; and
    0.3-10% emulsifiers.

* * * * *